United States Patent [19]

Rosenquist

[11] 4,357,271

[45] Nov. 2, 1982

[54] THERMOPLASTIC POLYCARBONATE RESINS REINFORCED WITH SILANE TREATED FILLERS

[75] Inventor: Niles R. Rosenquist, Evansville, Ind.

[73] Assignee: General Electric Company, Mt. Vernon, Ind.

[21] Appl. No.: 221,705

[22] Filed: Dec. 31, 1980

[51] Int. Cl.³ .......................... C08L 69/00; C08J 3/00
[52] U.S. Cl. ..................................... 523/212; 523/213; 524/447; 524/537; 524/611
[58] Field of Search ..................... 260/29.15 B, 37 PC

[56] References Cited

U.S. PATENT DOCUMENTS

| | | | |
|---|---|---|---|
| 4,107,130 | 8/1978 | Gergen et al. | 260/37 PC |
| 4,138,379 | 2/1979 | Scott et al. | 260/29.15 B |
| 4,147,707 | 4/1979 | Alewelt et al. | 260/37 PC |
| 4,230,611 | 10/1980 | Mark et al. | 260/29.15 B |
| 4,243,575 | 1/1981 | Myers et al. | 260/37 PC |

*Primary Examiner*—William F. Hamrock
*Assistant Examiner*—Peter F. Kulkosky
*Attorney, Agent, or Firm*—Martin B. Barancik; William F. Mufatti

[57] ABSTRACT

A thermoplastic polycarbonate molding composition containing a particulate filler coated with a silane.

14 Claims, No Drawings

THERMOPLASTIC POLYCARBONATE RESINS REINFORCED WITH SILANE TREATED FILLERS

This invention relates to a novel thermoplastic molding composition comprising a thermoplastic resin reinforced with a filler coated with a surface-treating agent. More specifically this invention relates to an aromatic polycarbonate resin containing a particulate filler treated with a silane.

BACKGROUND OF THE INVENTION

Fillers are probably the most widely used additive in thermoplastic resins. They are typically employed for economic reasons, i.e., to reduce the cost of relatively high priced resins, and/or to impart a particular property to a resin; e.g., increased modulus, flame retardancy, improved heat distortion, and the like. There is, however, a disadvantage in employing particulate fillers with thermoplastic polycarbonate resins. Many of the particulate fillers such as calcined clays, talc, earth metal salts, glass and the like contain reactive hydroxyl (—OH) groups which, when incorporated in a thermoplastic polycarbonate resin composition, tend to react with and thereby degrade the resin, especially when the resin composition is exposed to moisture.

Prior attempts to inactivate these free reactive groups include mixing the particulate fillers which such compounds as siloxanes, arylsiloxanes, silanols, and the like. While, these compounds readily coat such particulates, they are not effective in rendering the reactive groups inert since they are easily removed or become separated from the particulate fillers.

When employed with thermoplastic polycarbonate resins, particulate fillers detract from such physical properties of the resins as impact strength, thermal stability and the like while improving such properties as modulus. In the past fiberglass has been used in a similar manner in order to get a high modulus. However, fiberglass is more expensive than particulates and it likewise adversely affects such properties as impact strength.

SUMMARY OF THE INVENTION

One object of the present invention is to provide a new and improved reinforced thermoplastic molding composition.

Another object of the present invention is to provide a novel thermoplastic molding composition which is low in cost.

Still another object of the present invention is to provide a novel thermoplastic molding composition which retains such physical properties as high impact strength and thermal stability while improving such properties as modulus.

These and other objects are accomplished by a thermoplastic molding composition comprising a thermoplastic resin reinforced with a filler whcih is coated with a surface treating agent. In accordance with the present invention there is herein disclosed a thermoplastic resin composition comprising in admixture a thermoplastic aromatic polycarbonate resin, a filler and a silane of the following formula:

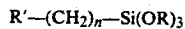

where R′ is an organic radical selected from the group consisting of alkyl, aryl, vinyl, amino, mercapto, acetoxy, epoxy and methacryloxy, which is bonded to the silicon atom by an alkyl chain containing from about 3 to about 6 carbon atoms, (N equals about 3 to about 6) and R is an alkyl radical having up to 4 carbon atoms.

DETAILED DESCRIPTION OF THE INVENTION

It has now been found that when particulate fillers or fibrous fillers containing reactive groups are coated with a silane, the reactive groups are rendered inert to polycarbonate resins. The silane-coated particulate or fibrous fillers can be readily employed with thermoplastic polycarbonate resins without degrading, corroding, or otherwise adversely affecting the resin. The particulate fillers have an advantage in that they are less expensive. Alternatively, the particulate fillers and silane can be mixed with the polycarbonate resin to achieve the same result.

The terms "particulate" or "fibrous fillers" can be used interchangeably and throughout this application are intended to mean, and should be understood as meaning, those fillers typically employed with thermoplastic resins and which are generally commercially available in the form of powders, granules, flakes, fibers and the like. Typical particulate fillers include oxides, such as, aluminum oxide, hydrated alumina, antimony trioxide, magnesium oxide, titanium dioxide and the like; carbonates, such as, calcium carbonate, barium carbonate and magnesium carbonate; sulfates, such as, barium sulfate and calcium sulfate; hydroxides, such as, calcium hydroxide and magnesium hydroxide; carbon black; metal powders, such as, copper, aluminum, bronze, lead and zinc; said silicates, such as mica, talc, clay, asbestos, feldspar, bentonite clay, wollastonite, pyrophillite, calcium silicate, magnesium silicate, kaolin and the like.

Also included under the silicates listed is calcined kaolin (or calcined clay) which is an anhydrous form of aluminum silicate. Calcined kaolin is produced by subjecting kaolin to high temperatures. A typical calcined clay has an average particle size of 1.2 microns. The calcined kaolins which can be employed in the practice of the present invention are commercially available products, an example of which is one manufactured by Engelhard Minerals and Chemicals Corporation under the designation Santintone Special.

The aromatic polycarbonates are well known and have been widely employed for the production of thermoplastic molded articles. One type of polycarbonate which is derived from bisphenol-A, is a high-performance plastic with good impact strength. In addition to ductility (impact strength), general-purpose polycarbonate has high transparency, wide temperature limits (high impact resistance below −60° C. and UL thermal endurance rating of 115° C. with impact), good dimensional stability, high creep resistance and electrical properties which qualify it as sole support for current carrying parts (up to 125° C. without loss of impact strength).

Among the thermoplastic resins contemplated within this invention, high molecular weight aromatic polycarbonate resins are believed to be the most sensitive to moisture degradation and one of the most difficult resins with which to admix other ingredients and compounds such as fillers. Many ingredients and compounds that are compartible with most other thermoplastic resins have been found to be incompatible with and tend to corrode or otherwise degrade these aromatic polycarbonates, particularly when they are subjected to the elevated temperatures used during molding operations.

In the practice of this invention, the high molecular weight aromatic polycarbonates which can be employed herein are homopolymers and copolymers prepared by reacting a dihydric phenol with a carbonate precursor, and mixtures thereof, which have an intrinsic viscosity of 0.40 to 1.0 dl./g. as measured in methylene chloride at 25° C. Typical of some of the dihydric phenols that can be employed in the practice of this invention are bisphenols such as bis(4-hydroxyphenyl) methane, 2,2-bis(4-hydroxyphenyl) propane (hereinafter referred to as bisphenol-A), 2,2-bis(4-hydroxy-3-methylphenyl) propane, 4,4-bis(4-hydroxyphenyl) heptane, 2,2-bis(4-hydroxy-3,5-dichlorophenyl) propane, 2,2-bis(4-hydroxy-3,5-dibromophenyl) propane, and the like; dihydric phenol ethers such as bis(4-hydroxyphenyl) ether, bis(3,5-dichloro-4-hydroxyphenyl) ether, and the like; dihydroxydiphenyls such as p,p'-dihydroxydiphenyl, 3,3'dichloro-4,4'-dihydroxydiphenyl, and the like; dihydroxyaryl sulfones such as bis(4-hydroxyphenyl) sulfone, bis(3,5-dimethyl-4-hydroxyphenyl) sulfone, and the like; dihydroxy benzenes, resorcinol, hydroquinone, halo- and alkyl-substituted dihydroxybenzenes, such as 1,4-dihydroxy-2,5-dichlorobenzene, 1,4-dihydroxy-3-methylbenzene and the like; and dihydroxy diphenyl sulfoxides such as bis(4-hydroxyphenyl) sulfoxide, bis-(3,5-dibromo-4-hydroxyphenyl) sulfoxide, and the like. A variety of additional dihydric phenols are also available to provide carbonate polymers and are disclosed in U.S. Pat. Nos. 2,998,835; 3,029,365 and 3,153,008. Also suitable for preparing the aromatic carbonate polymers are copolymers prepared from any of the above copolymerized with halogen-containing dihydric phenols such as 2,2-bis(3,5-dichloro-4-hydroxyphenyl)propane, 2,2-bis(3,5-dibromo-4-hydroxyphenyl) propane, and the like.

It is of course possible to employ two or more different dihydric phenols or a copolymer of a dihydric phenol with glycol or with hydroxy or acid terminated polyester, or with a dibasic acid in the event a carbonate copolymer or interpolymer rather than a homopolymer is desired for use in the preparation of the compositions of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein, are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydrich phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric materials of a dihydric phenol, a dicarboxylic acid and carbonic acid. These are disclosed in U.S. Pat. No. 3,169,121 which is incorporated herein by reference.

The aromatic carbonate polymers of this invention are prepared by employing a molecular weight regulator, an acid acceptor and a catalyst. The molecular weight regulators which may be employed in carrying out the process of this invention include phenol, cyclohexanol, methano, paratertiarybutylphenol, parabromophenol, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkali earth metal.

The catalysts which are employed herein can be any of the suitable catalysts that aid the polymerization of dihydric phenols with phosgene. Suitable catalysts include a tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the dihydric phenol and carbonate precursor to provide a thermoplastic randomyl branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic ompounds are trimellitic anhydride or trimellitic acid or their acid chlorides.

Also included herein are blends of a linear polycarbonate and a branched polycarbonate.

The silanes useful in the practice of the present invention are characterized by the general formula:

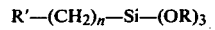

R'—(CH$_2$)$_n$—Si—(OR)$_3$ where R' is a radical selected from the group consisting of alkyl, aryl, vinyl, amino, mercapto, acetoxy, epoxy, and methacryloxy and R is an alkyl radical having up to 4 carbon atoms (n equals about 3 to about 6). The R' radical is bonded to the silicon atom by an alkyl chain containing from about 3 to about 6 carbon atoms, the most preferred alkyl chain being 3 carbon atoms in length. It is preferred that the R' radical be an amino radical and that R be ethyl.

When in use, the alkoxy groups of the above-described silanes hydrolyze to form silanols that react with or otherwise condense in the presence of the particular filler surfaces. At the other end of the silane molecule, the functional organic groups (such as vinyl, epoxy and amino) possibly react with the thermoplastic resin.

The silanes that can be employed in the practice of the present invention are commercially available products such as γ-aminopropyltriethoxy silane manufactured by the Union Carbide Corporation under the designation A-1100.

The silanes can be incorporated into the thermoplastic resin either as a separate additive or as a coating on the particulate filler to be added to the resin. Although the amount of particulate filler employed with a thermoplastic resin is not critical, the amount may depend upon the type of filler to be used, filler amounts typically range from about 15% to about 25% based on the weight of the resin-filler composition. When used as an additive, the silanes are generally employed in the amounts ranging from about 0.5% to about 2.0% based on the weight of the filler and more preferably from about 1.0% to about 1.25%. The above amounts are equally applicable in the situation where the particulate filler is pre-coated with the silanes prior to adding the coated particulate to the thermoplastic resin. The composition of the present invention is prepared by blending the thermoplastic resin with the particulate filler and silane, or alternatively, with the silane treated particulate filler, by conventional methods.

Optionally, the composition of the instant invention can also contain a methyl hydrogen silicone fluid that conforms to the general formula:

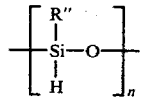

wherein R" is conventionally methyl and n is an integer from about 1 to about 100 and preferably about 60. The radicals represented by R" can also be longer chain alkyl radicals, aryl radicals, alkylaryl radicals and the like. Thus, the term methyl hydrogen silicone fluid should be understood as also including these species. One of the methyl hydrogen silicone fluids that can be employed in the practice of this invention is manufactured by the General Electric Company under the designation DF-1040 and possesses a viscosity of 40 centistokes at 25° C.

The methyl hydrogen silicone fluid is added in conjunction with the silane in amounts based on the weight of the silane. In general, the amount of methyl hydrogen silicon fluid added is equivalent to one-half of the amount of silane additive. The methyl hydrogen silicone fluid can be directly added with the silane to the resin-filler composition. If the filler is first treated with the silane, the methyl hydrogen silicone fluid can be directly added to the pre-treated filler resin blend.

Obviously, other materials can also be employed with the thermoplastic resins of this invention and include such materials as anti-static agents, pigments, thermal stabilizers, ultraviolet stabilizers and the like.

PREFERRED EMBODIMENTS OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

A polycarbonate composition was prepared by reacting essentially equimolar amounts of 2,2-bis(4-hydroxyphenyl) propane (referred to as bisphenol-A) and phosgene in an organic medium with triethylamine, aqueous sodium hydroxide and phenol. To 80 parts of the polycarbonate composition was added 20 parts of Satintone Special, a calcined aluminum silicate (calcined kaolin) manufactured by Englehard Minerals and Chemicals Corporation. In addition to the calcined kaolin, 1.0% of γ-aminopropyl-triethoxy silane based on the weight of the calcined kaolin was added to the resin-filler composition. The silane is manufactured and sold by the Union Carbide Corporation under the tradename A-1100. The resin powder, calcined kaolin and silane were blended together in steel cans on a conventional paint shaker.

The resulting polymer was then extruded using a vacuum-vented, single screw extruder (Davis-Standard) which was operated at between about 265° C. to about 282° C. The extrudate was comminuted into pellets and the pellets molded at 290° C. on a 3 oz. reciprocating screw molding machine (Van Dorn) into test bars of about 2½ in. by about ½ in. by about ⅛ in. thick.

Impact strength was measured according to Notched Izod and Unnotched Izod test on the ⅛ in. thick molded samples according to ASTM D256.

Intrinsic viscosity was measured at 25° C. in methylene chloride or resin samples from which the filler particles had been removed by filtration.

The impact strength, intrinsic viscosity and flexural modulus of the resin of the resin containing calcined koalin filler and of the resin containing calcined kaolin filler plus γ-aminopropyl-triethoxy silane is set forth in Table 1. The sample labelled CONTROL is the polycarbonate as prepared without the filler or silane.

Flexural modulus data was obtained using an Instron universal testing instrument manufactured by the Instron Corporation of Canton, Mass.

TABLE 1

| | | Impact Strength ft.lb/in. | | Intrinsic Viscosity dl./gm. | | |
|---|---|---|---|---|---|---|
| Filler | Additive | ⅛ in. Notched Izod | ½ in. Unnotched Izod | Pellets | Parts | Modulus Flexural PSI |
| CONTROL 20% | CONTROL | 16 | >40 | .490 | .487 | 330,000 |
| Santintone Special 20% | — | Too Weak to Test | .8 | .406 | .245 | Too Weak to Test |
| Santintone | .2% | | | | | |

TABLE 1-continued

| Filler | Additive | Impact Strength ft.lb/in. | | Intrinsic Viscosity dl./gm. | | Modulus Flexural PSI |
| --- | --- | --- | --- | --- | --- | --- |
| | | ⅛ in. Notched Izod | ⅛ in. Unnotched Izod | Pellets | Parts | |
| Special | A1100 | 1.9 | >40 | .463 | .445 | 520,000 |

It can be seen from the data in Table 1 that when the particulate filler is incorporated into the resin the impact strength of the resin drops dramatically and the resin undergoes significant degradation in the extrusion process. The data also reveals that the addition of the silane to the resin-filler composition substantially reverses the adverse effects of the filler on the resin composition and yields a composition with much improved modulus over the control.

EXAMPLE 2

The polycarbonate composition was prepared as in Example 1.

A solution of γ-aminopropyltriethoxy silane was added to calcined kaolin (Satintone Special) to provide for a 1% loading of the kaolin with the silane. In this case, a 20% solution of γ-aminopropyltriethoxy silane was prepared which contained 35 grams of the silane in a solvent composed of 9 parts methanol and 1 part water. The solution was then added to 3500 grams of calcined kaolin incrementally over about 2 minutes and then blended for about 5 minutes in a laboratory scale Patterson-Kelly twin shell blender, Model L-BS8. The coated kaolin was then dried at 115° C. for 2 hours. The powdered polycarbonate resin and the silane coated calcined kaolin were blended in stainless steel cans on a conventional paint shaker.

The resulting polymer was extruded, comminuted into pellets, and molded as in Example 1.

The impact strength and intrinsic viscosity of the resin containing calcined kaolin initially pre-treated with γ-aminopropyltriethoxy silane is set forth in Table 2 and compared with the resin prepared by simultaneously adding the silane and the calcined kaolin to the polycarbonate.

TABLE 2

| Filler | Additive | Impact Strength ft.lb/in. | | Intrinsic Viscosity dl./gm. | |
| --- | --- | --- | --- | --- | --- |
| | | ⅛ in. Notched Izod | ⅛ in. Unnotched Izod | Pellets | Parts |
| 20% Santintone Special | .2% A1100 | 1.9 | >40 | .463 | .445 |
| 20% Santintone Special Pre-treated with 1% A1100 | — | 1.9 | >40 | .467 | .422 |

It can be seen from the data in Table 2 that the silane can be incorporated into the resin-filler composition by either of two methods, i.e., pretreatment of the filler with the silane before the addition of the filler to the resin or simultaneous addition of the filler and the silane to the resin.

EXAMPLE 3

Polycarbonate compositions containing calcined kaolin and γ-aminopropyltriethoxy silane were prepared as in Example 1. To the polycarbonate composition were added varying amounts of a methyl hydrogen silicone fluid manufactured and sold by the General Electric Company under the tradename DF-1040.

The resulting polymers were extruded, comminuted into pellets and molded as in Example 1.

The impact strength and intrinsic viscosity of the resin with and without the methyl hydrogen silicone fluid is set forth in Table 3.

TABLE 3

| Filler | Additive | Impact Strength ft.lb/in. | | Intrinsic Viscosity dl./gm. | |
| --- | --- | --- | --- | --- | --- |
| | | ⅛ in. Notched Izod | ⅛ in. Unnotched Izod | Pellets | Parts |
| 20% Santintone Special | .2% A1100 | 1.9 | >40 | .463 | .445 |
| 20% Santintone Special | .2% A1100 0.05% DF1040 | 1.9 | >40 | .470 | .447 |
| 20% Santintone Special | .2% A1100 .1% DF1040 | 1.7 | >40 | .472 | .446 |
| 20% Santintone Special | .2% A1100 .2% DF1040 | 1.9 | >40 | .471 | .451 |

The polycarbonate resin prior to compounding with kaolin exhibited an intrinsic viscosity of 0.49 dl/g before molding.

It can be seen from the data in Table 3 that the addition of the methyl hydrogen silicone fluid in conjunction with the silane further reduces the degradation experienced by the calcined kaolin-filled resin in the extrusion process by about 30%.

EXAMPLE 4

Polycarbonate compositions containing calcined kaolin were prepared as in Example 1. To the calcined kaolin-polycarbonate compositions were added various silanes in amounts of 0.2% based on the weight of the calcined kaolin-polycarbonate composition.

The resulting polymers were extruded, comminuted into pellets and molded as in Example 1.

The impact strength of the resin containing calcined kaolin and the various silanes is set forth in Table 4.

TABLE 4

| Additive | Amount of Additive % of Composition | Impact Strength (ft.lb/in.) | |
| --- | --- | --- | --- |
| | | ⅛ in. Notched Izod | ⅛ in. Unnotched Izod |
| γ-aminopropyltriethoxy silane | .2 | 1.68 | 40 |
| n-octyl triethoxy silane | .2 | 0.76 | 9.5 |
| methyl triethoxy silane | .2 | 0.67 | 4.5 |
| phenyl triethoxy silane | .2 | 0.67 | 9.6 |
| vinyl triethoxy silane | .2 | 0.63 | 16.1 |
| γ-methacryloxypropyl-trimethoxy silane | .2 | 0.89 | 31.6 |
| 3-(3,4-epoxycyclohexyl)- | | | |

TABLE 4-continued

| Additive | Amount of Additive % of Composition | Impact Strength (ft.lb/in.) ⅛ in. Notched Izod | ⅛ in. Unnotched Izod |
|---|---|---|---|
| ethyltrimethoxy silane | .2 | 0.69 | 4.5 |
| γ-glycidoxypropyl-trimethoxy silane | .2 | 0.88 | >37.7 |

Other modifications and variations of the present invention are possible in the light of the above teachings. It is therefore to be understood that changes may be made in the particular embodiments described above which are within the full intended scope of the invention as defined in the appended claims.

What is claimed is:

1. A composition comprising
   a. A major amount of polymeric resin comprising a thermoplastic aromatic polycarbonate resin in admixture, with
   b. a minor amount of a filler having reactive groups which are normally reactive with aromatic polycarbonate resin, and
   c. a minor amount of a silane of the following formula R'—(CH$_2$)$_n$Si(OR)$_3$ 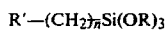

where R' is an organic radical selected from the group consisting of alkyl, aryl, vinyl, amino, mercapto, acetoxy, epoxy, and methacryloxy,
   n is an integer of about 3 to about 6, and
   R is alkyl having up to four carbon atoms.

2. The composition of claim 1, wherein said aromatic polycarbonate polymer has an intrinsic viscosity of 0.40 to 1.0 dl./gm. in methylene chloride at 25° C.

3. The composition of claim 1, wherein said filler is calcined kaolin.

4. The composition of claim 1, wherein n is 3.

5. The composition of claim 1, wherein R' is an amino radical and R is ethyl.

6. The composition of claim 1, wherein the silane is γ-aminopropyltriethoxysilane.

7. The composition of claim 1, wherein said filler comprises from about 10 percent to about 30 percent by weight based on the weight of the polymeric resin composition.

8. The composition of claim 7, wherein said filler comprises about 20 percent by weight based on the weight of the polymeric resin composition.

9. The composition of claim 1, wherein said silane comprises from about 0.1 percent to about 2.0 percent by weight based on the weight of said filler.

10. The composition of claim 9, wherein said silane comprises from about 1.0 percent to about 1.25 percent by weight based on the weight of said filler.

11. The composition of claim 1, further comprising a organohydrogen silicone fluid represented by the general formula:

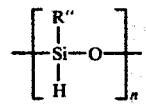

wherein R" is a radical selected from the group consisting of alkyl, aryl and alkylaryl radicals, and n is an integer from about 1 to about 100.

12. The composition of claim 11, wherein R" is methyl and n is an integer of about 60.

13. The composition of claim 11, wherein the organohydrogen silicone fluid comprises about one-half the weight of the silane.

14. The composition of claim 1, wherein said filler is pre-coated with said silane.

* * * * *